United States Patent [19]
Johnston et al.

[11] Patent Number: 5,398,443
[45] Date of Patent: Mar. 21, 1995

[54] WINDOWED SHELTER FOR PLANTS

[75] Inventors: Vincent P. Johnston; Marjorie R. Johnston, both of Sheridan, Wyo.; David B. Johnston, Fairport, N.Y.

[73] Assignee: Northern Tier Gardens Corporation, Fairport, N.Y.

[21] Appl. No.: 93,525

[22] Filed: Jul. 19, 1993

[51] Int. Cl.6 .............................................. A01G 13/02
[52] U.S. Cl. ........................................ 47/21; 47/28.1; 135/115
[58] Field of Search ..................... 47/19, 21, 21 A, 26, 47/28.1, 28.1 C, 28.1 RC, 58.01; 135/115, 117

[56] References Cited

U.S. PATENT DOCUMENTS

| | | |
|---|---|---|
| 74,879 | 2/1868 | Bartlett . |
| 633,528 | 9/1899 | Morris ................................ 135/115 |
| 718,109 | 1/1903 | Easterling ........................... 47/28.1 |
| 912,184 | 2/1909 | Scott ..................................... 47/28.1 |
| 1,112,052 | 9/1914 | Campbell ............................ 47/28.1 |
| 1,814,339 | 7/1931 | Sato . |
| 1,834,084 | 12/1931 | Barnes ................................. 135/115 |
| 2,011,897 | 8/1935 | Hauck . |
| 2,015,471 | 9/1935 | Genuit ..................................... 47/26 |
| 2,064,707 | 12/1936 | Wilson . |
| 2,731,972 | 1/1956 | Braun ................................... 47/28.1 |
| 2,835,078 | 5/1958 | Whitmore .............................. 47/26 |
| 3,093,930 | 6/1963 | Witkowski . |
| 3,214,865 | 11/1965 | Rosenvold et al. . |
| 3,226,881 | 1/1966 | Garrett . |
| 3,701,241 | 10/1972 | Zuckerman ............................ 47/26 |
| 3,812,616 | 5/1974 | Koziol ................................. 135/117 |
| 4,124,953 | 11/1978 | Patton . |
| 4,291,493 | 9/1981 | Monson . |
| 4,347,685 | 9/1982 | Medford et al. . |
| 4,392,326 | 7/1983 | Boria . |
| 4,711,051 | 12/1987 | Fujimoto . |
| 4,787,173 | 11/1988 | Lewis .................................... 47/21 |
| 4,903,432 | 2/1990 | Velagaleti et al. . |
| 5,001,860 | 3/1991 | Rudnick . |
| 5,054,234 | 10/1991 | Cassells . |

FOREIGN PATENT DOCUMENTS

| | | | |
|---|---|---|---|
| 581196 | 10/1946 | United Kingdom | 47/28 |
| 714784 | 9/1954 | United Kingdom | 47/26 |
| 1341114 | 9/1987 | U.S.S.R. | 47/28.1 |
| 1508997 | 9/1989 | U.S.S.R. | 47/73 |

*Primary Examiner*—Ramon S. Britts
*Assistant Examiner*—Joanne C. Downs
*Attorney, Agent, or Firm*—Eugene Stephens & Associates

[57] ABSTRACT

A shelter for protecting young plants has a shell (10) made from a translucent resin material. Windows (28) are formed through a peripheral wall (16) on one side of the shell (10) for controlling the admission of light and air into the shelter. A hood (30) made from a transparent film of resin material covers the windows (28) to conserve heat and moisture within the shelter. The young plants are acclimated to their surroundings by progressively removing the hood (30) from the windows (28).

11 Claims, 2 Drawing Sheets

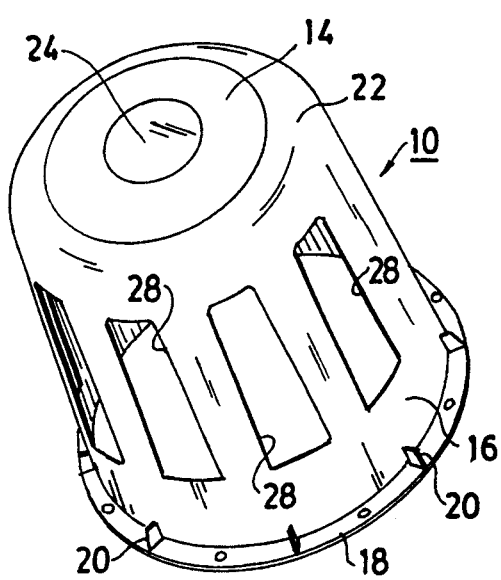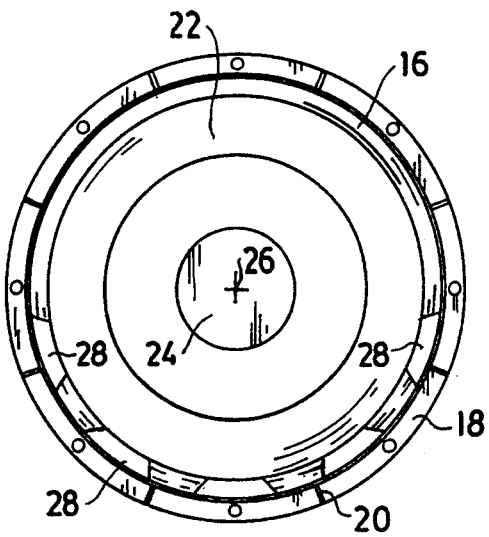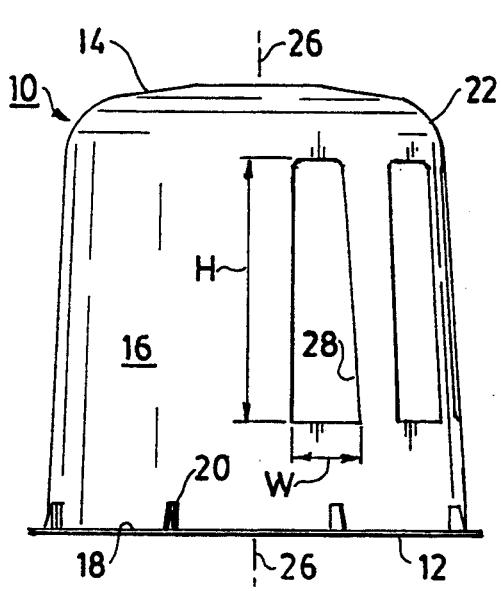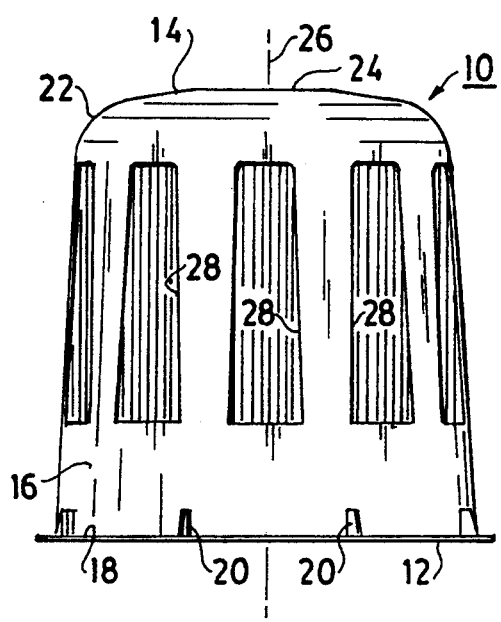
FIG.1
FIG.2
FIG.3
FIG.4

WINDOWED SHELTER FOR PLANTS

BACKGROUND

Plant shelters protect young plants against early frost, damaging wind, unseasonably cool weather, heavy rain, hail, excessive sunlight, and insects and other pests. In addition, heat and moisture are conserved within the shelters to provide an environment that promotes the growth of young plants. The protections and controlled environment allow for earlier plantings that significantly extend growing seasons, especially in cold climates.

Eventually the shelters are removed to allow the young plants to grow to maturity. However, the abrupt removal of the plant shelters can subject the young plants to considerable stress. Accordingly, some plant shelter designs control ventilation for gradually acclimating or "hardening" young plants to their surroundings.

For example, U.S. Pat. No. 74,879 issued to R. M. Bartlett more than a century ago discloses a plant shelter having a conical shell made from pasteboard or thin wood and having two sets of openings. One set of large openings is covered with an oil paper, muslin, or glass for admitting light into the shelter. Another set of small openings is covered by a rotatable collar having a similar set of openings that can be variously aligned with or offset from the set of small openings in the cone-shaped hood for controlling ventilation within the shelter. Additional ventilation is provided by raising the hood on a pole as the protected plants continue to grow.

Most subsequent plant shelter designs for controlling ventilation have generally followed Bartlett's approach of providing rigid relatively movable parts for adjusting opening sizes. Examples of such designs are found in U.S. Pat. No. 3,093,930 to Witkowski; U.S. Pat. No. 3,226,881 to Garrett; U.S. Pat. No. 4,392,326 to Boria; and U.S. Pat. No. 4,711,051 to Fujimoto. The multiple parts of these designs add cost, and the varying size openings also affect the amount of light admitted into the shelters.

An alternative approach to controlling ventilation in plant shelters is disclosed in U.S. Pat. No. 3,214,865 to Rosenvold et al. The alternative plant shelter is formed from a transparent or translucent plastic material that is perforated for forming a series of knockout sections. Ventilation openings are formed by removing the knockout sections. However, once formed, the ventilation openings are permanent, and a new shelter is required to reduce ventilation.

U.S. Pat. No. 1,814,339 to Sato discloses a plant shelter that provides for separately controlling the admission of air and light into the shelter. Ventilation is controlled in the usual way with an adjustable cap covering an opening. The shelter is made from glass for admitting light. However, one side of the shelter is made thicker with corrugations that are intended to diffuse light and heat. The corrugated side can be rotated toward or away from the source of light to block varying amounts of light from entering the shelter. In addition to requiring multiple rigid parts for controlling ventilation, the glass material is heavy and subject to breakage.

SUMMARY OF INVENTION

Our invention relates to an improved plant shelter that provides for independently controlling the admission of light and air through common windows. A reusable part forms a rigid structure with windows, and a replaceable part forms a transparent film covering the windows. The film can be progressively removed or penetrated to adjust the amount of air admitted through the windows without significantly changing the amount of light admitted through the same windows.

Generally, our invention includes a dome-shaped body or shell molded from a resin material. Windows are formed in a peripheral wall of the shell, and a transparent film of resin material covers the windows. The transparent film can take different forms.

For example, the transparent film can be formed as a hood that fits over the shell for covering the windows. A band secures an open end of the hood to the shell. However, the open end can be rolled up about the band for adjusting the amount of air admitted through the windows.

The transparent film can also take the form of a sheet of self-attracting material that is wrapped about the periphery of the shell. The film is overlapped along a portion of the periphery for securing the film to the shell. The admission of air into the shelter is adjusted by progressively perforating a portion of the film that covers the windows.

The shell is preferably made of a translucent material for reducing the amount of direct sunlight that is allowed to enter the shelter. The windows are preferably limited to an area that includes approximately one-half of the peripheral wall. The amount of direct sunlight that is allowed to enter the shelter is adjusted by rotating the shelter windows toward or away from the sun. However, the windows are shaped for admitting sunlight for extended periods throughout a day.

DRAWINGS

FIG. 1 is a perspective view of a plant shelter body.

FIG. 2 is a top view of the plant shelter body showing windows positioned within a limited portion of the body.

FIG. 3 is a front view of the plant shelter body.

FIG. 4 is a side view of the plant shelter body.

DETAILED DESCRIPTION

Figure 5:
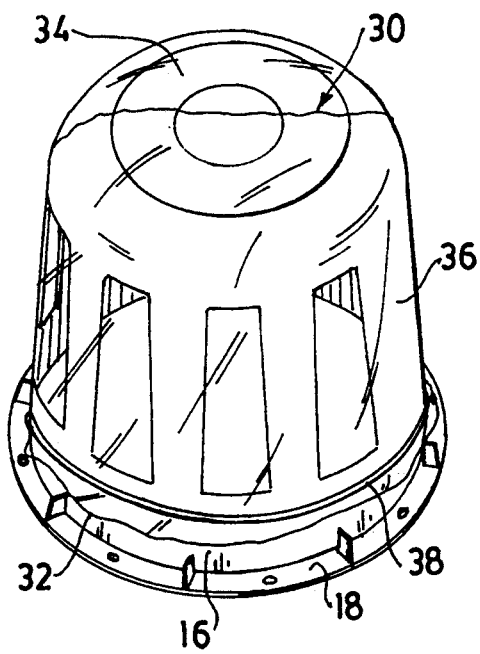
FIG. 5 is a perspective view of the entire plant shelter in which the body is covered by a transparent hood.

Our preferred plant shelter has a dome-shaped body or shell 10 as depicted in the first four drawing figures. The shell 10, which can be molded from a translucent resin material, has an open end 12, a closed end 14, and a peripheral wall 16 that surrounds an interior space.

The open end 12 is surrounded by a flange 18 that is reinforced with ribs 20. Soil can be packed over the flange 18 to hold the shell 10 in place. The closed end 14 has a rounded portion 22 for shedding water and a flat portion 24 for affixing an appropriate logo. The peripheral wall 16 is formed as a conic section centered about an axis 26. In addition, the peripheral wall 16 is inclined with respect to the central axis 26 through an angle between approximately two degrees and ten degrees to permit the shell 10 to be nested with similar dome-shaped bodies for conserving storage space.

Windows 28 are formed through the shell 10 within a limited area of the peripheral wall 16. Preferably, the windows 28 are limited to an area extending throughout no more than one-half of the perimeter of the peripheral wall 16 so that all of the windows 28 are positioned on one side of the shell 10. This arrangement allows the windows 28 to be rotated about the central axis 26 either toward or away from the sun to adjust the amount of direct sunlight admitted into the shell 10.

Each of the windows 28 is dimensioned by orthogonal measures of a height "H" and a width "W". The height "H" extends generally in the direction of central axis 26 and preferably exceeds the width "W" by a factor of three. The prescribed ratio of height "H" to width "W" allows direct sunlight to enter the shell without interruption throughout early or late periods of the day, when the sun is near the horizon. However, the relatively slight angle between the peripheral wall 16 and the central axis 26 protects young plants from direct sunlight at midday, when the sun is highest in the sky.

Figure 6:
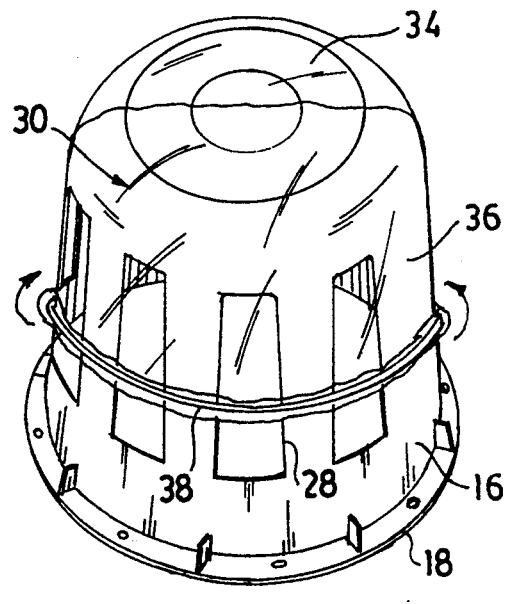
FIG. 6 is a perspective view of the plant shelter in which the transparent hood is rolled up for admitting air through the windows.

FIGS. 5 and 6 show the shell 10 at least partially covered by a similarly shaped hood 30 made from a transparent resin film. The shell 10 and hood 30 complete a first example of our new plant shelter. Like the shell 10, the hood 32 has an open end 32, a closed end 34, and a peripheral surface 36. The open end 32 is secured to the shell with an elastic band 38, which can be made of rubber or similar material treated to withstand direct sunlight.

The closed end 34 and peripheral surface 36 of the hood enclose the closed end 14 and peripheral wall 16 of the shell 10. The peripheral surface 36 of the hood, as shown in FIG. 5, also covers the windows 28. The elastic band 38 seals the open end 32 of the hood to the shell 10 to trap heat and moisture within the plant shelter.

The hood 30 can be progressively removed by rolling up the open end 32 about the elastic member as shown in FIG. 6. Young plants can be gradually acclimated or hardened to the surrounding environment by periodically rolling up the hood 32 to uncover increasingly large areas of the windows 28. Since the hood 30 is transparent, uncovering the windows 28 has no significant effect on the amount of light that is admitted though the windows 28.

The plant shelter of FIGS. 5 and 6 is used for promoting the growth of young plants by covering the young plants with the shell 10. Soil is packed over the flange 18 to secure and seal the shell to the ground. The open end 32 of the hood is fit over the shell 10, completely covering the windows 28. The elastic band 38 is also fit over the shell 10 to secure and seal the open end 32 of the hood to the shell.

The hood 30 traps heat and moisture within the shell 10, providing a controlled environment for promoting early growth of the young plants. The amount of direct sunlight admitted through the windows 28 is adjusted by rotating the plant shelter about the central axis 26 to control the orientation of the windows 28 with respect to the path of the sun.

When the young plants are sturdy enough to survive in the surrounding environment, the open end 32 of the hood is rolled up about the elastic member 38 to uncover a small portion of the windows 28. This allows a limited amount of air circulation between the interior space of the shelter and the surrounding environment. Following periods of adjustment, the windows 28 are progressively uncovered in a similar manner to further acclimate the young plants. Finally, the plant shelter itself is entirely removed to allow the young plant to grow to maturity.

Figure 7:
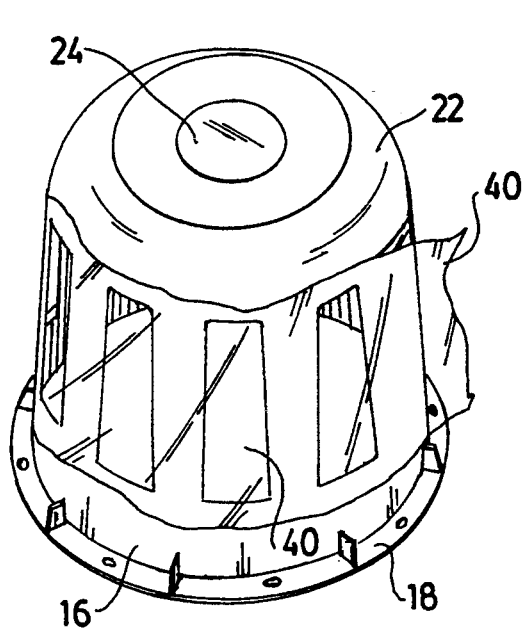
FIG. 7 is a perspective view of the plant shelter in which a film is wrapped about a periphery of the body.
Figure 8:
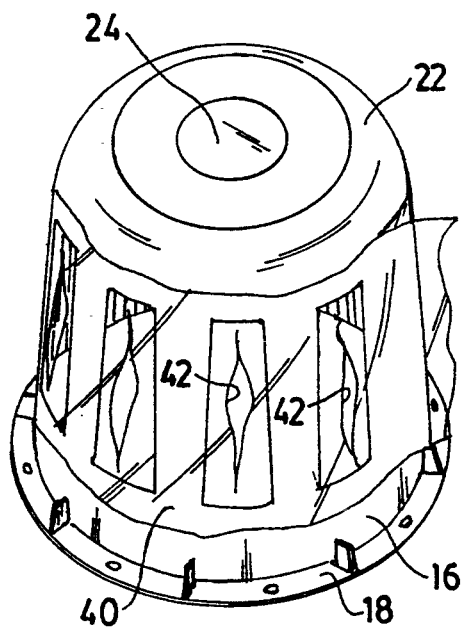
FIG. 8 is a perspective view of the plant shelter in which the film is cut for admitting air through the windows.

A second example of our new plant shelter is shown in FIGS. 7 and 8. In place of the hood 30, the shell 10 is covered with a sheet 40 that is made from a transparent resin film. The sheet 40 is wrapped around the peripheral wall 16 of the shell, completely covering the windows 28. The resin material of the sheet 40 is preferably self-attracting, and the sheet 40 is overlapped along a portion of the peripheral wall 16 to secure and seal the sheet 40 to the shell 10.

The plant shelter of FIGS. 7 and 8 can be used to similarly promote the growth of young plants. For example, the young plants can be covered with the shell 10, and soil can be packed over the flange 10 to hold the shell on the ground. However, instead of placing the hood 30 over the shell 10, the sheet 40 is wrapped around the peripheral wall 16, enclosing the windows 28 to conserve heat and moisture within the shelter.

The young plants are acclimated by progressively perforating enlarged areas of the sheet 40 within the windows 28. This can be accomplished by using a sharp instrument to puncture or tear the sheet 40. Initially, only small openings 42 are made in the sheet to permit a limited circulation of air through the windows 28. However, the size of the openings 42 is increased until the young plants are sturdy enough to survive in their surrounding environment. Since the openings 42 are made in a transparent material, the variation in opening size does not significantly affect the amount of light admitted through the windows 28.

Although it is possible to use the hood 30 of the preceding embodiment more than once, the sheet 40 needs to be replaced after each planting cycle. The sheet 40 can be replaced with conventional plastic wraps that are normally used for wrapping food. For example, the sheet 40 can be unwrapped after use and the shell 10 can be rewrapped with another sheet cut from a roll of plastic wrap.

Both the hood 30 and the sheet 40 can be tinted or otherwise treated for blocking particular wavelengths of light. For example, the hood 30 can be treated to protect the shell 10 and young plants from harmful ultraviolet light.

We claim:

1. A windowed shelter for protecting plants comprising:
    a dome-shaped body made from a resin material having a central axis and a peripheral surface surrounding an interior space;
    windows formed in said body for admitting light and air into said interior space; and
    a hood made from a substantially transparent resin film having an open end for fitting over said body and for covering said windows to retain heat and moisture within said interior space.

2. The shelter of claim 1 further comprising a band for securing said open end of the hood to said body and for rolling up said open end of the hood to adjust an amount of air admitted through said windows without significantly changing an amount of light admitted through the same windows.

3. The shelter of claim 2 in which said band is made from an elastic material.

4. The shelter of claim 1 in which said hood has a shape that matches the shape of said shelter.

5. The shelter of claim 1 in which said hood is treated to resist transmission of predetermined wavelengths of light.

6. The shelter of claim 1 in which said windows are limited to an area that includes approximately one-half of said peripheral surface for adjusting an amount of light admitted through said windows by rotating said body about its central axis without significantly changing an amount of air admitted through the same windows.

7. The shelter of claim 6 in which said windows have a height and width, said height extending generally along said central axis, and said height exceeding said width for effectively admitting light for longer periods throughout a day.

8. A method of using a windowed plant shelter to promote growth of young plants comprising the steps of:

covering a plant with a dome-shaped shelter having a central axis and a peripheral surface interrupted by windows;

fitting an open end of a transparent hood over the shelter;

covering the windows with the transparent hood for retaining heat and moisture within the shelter;

securing the open end of the transparent hood to the shelter; and progressively removing the transparent hood from the shelter for adjusting an amount of air admitted through the windows without significantly changing the amount of light admitted through the same windows.

9. The method of claim 8 in which said step of securing the open end of the transparent hood includes placing a band around the hood.

10. The method of claim 9 in which said step of progressively removing the transparent hood includes rolling up the open end of the hood around the band.

11. The method of claim 8 in which the windows are limited to an area that includes approximately one-half of the peripheral surface and including the further step of adjusting an amount of light admitted through the windows by rotating the shelter about its central axis without significantly changing an amount of air admitted through the same windows.

* * * * *